United States Patent [19]

Niemiec

[11] Patent Number: 5,181,837
[45] Date of Patent: Jan. 26, 1993

[54] ELECTRIC MOTOR DRIVEN INLINE HYDRAULIC APPARATUS

[75] Inventor: Albin J. Niemiec, Sterling Heights, Mich.

[73] Assignee: Vickers, Incorporated, Troy, Mich.

[21] Appl. No.: 687,173

[22] Filed: Apr. 18, 1991

[51] Int. Cl.$^5$ ............................................. F04B 35/04
[52] U.S. Cl. .................................. 417/350; 417/22; 417/205; 417/372
[58] Field of Search .................. 417/350, 372, 205, 18, 417/20, 22, 23, 28, 48

[56] References Cited

U.S. PATENT DOCUMENTS

| | | | |
|---|---|---|---|
| 3,094,272 | 6/1963 | McClure | 417/350 |
| 3,315,604 | 4/1967 | Roeske | 417/350 |
| 3,672,793 | 6/1972 | Yowell | 417/350 |
| 4,050,263 | 9/1977 | Adalbert et al. | 417/205 |
| 4,108,574 | 8/1978 | Bartley et al. | 417/22 |
| 4,229,142 | 10/1980 | Le Dall et al. | 417/350 |
| 4,255,098 | 3/1981 | Hertell | 417/372 |
| 4,657,487 | 4/1987 | Schönwald et al. | 417/372 |
| 4,699,570 | 10/1987 | Bohn | 417/22 |
| 4,832,575 | 5/1989 | Miller et al. | 417/22 |

*Primary Examiner*—Richard A. Bertsch
*Assistant Examiner*—Charles G. Freay
*Attorney, Agent, or Firm*—Barnes, Kisselle, Raisch, Choate, Whittemore & Hulbert

[57] ABSTRACT

An electric motor driven inline hydraulic apparatus comprising a housing having end plates closing said housing, an electric motor stator mounted in said housing, an electric motor rotor, a shaft on which the rotor is mounted is journalled in the housing and a vane type pump mounted on one of the end plates. The shaft extends through an opening in the end plate and is connected to the vane rotor of the pump. Hydraulic fluid is supplied to the interior of the electric motor housing and flows through passages in the housing to the intake of the vane pump on the end plate. In one form, the vane pump delivers fluid through an outlet in the end plate on which it is mounted. In another form, the vane pump delivers fluid through an outlet in the pump housing.

33 Claims, 8 Drawing Sheets

| ELECT. MTR. SPEED SELECTOR (2) | ELECT. MTR. SPEED SELECTOR (3) | UNLOAD VALVE (1) | UNLOAD VALVE (4) | NET FLOW Q |
|---|---|---|---|---|
| ON | OFF | ON | OFF | MTR.SPEED(2) X PUMP (A) |
| ON | OFF | OFF | ON | MTR.SPEED(2) X PUMP (B) |
| ON | OFF | OFF | OFF | MTR.SPEED(2) X PUMPS(A)+(B) |
| OFF | ON | ON | OFF | MTR.SPEED(3) X PUMP (B) |
| OFF | ON | OFF | ON | MTR.SPEED(3) X PUMP (A) |
| OFF | ON | OFF | OFF | MTR.SPEED(3) X PUMPS(A)+(B) |

ELECTRIC MOTOR DRIVEN INLINE HYDRAULIC APPARATUS

This invention relates to power transmissions and particularly to electric motor driven hydraulic pumps.

BACKGROUND AND SUMMARY OF THE INVENTION

In hydraulic pumps which are driven by an electric motor, it has been common to provide an electric motor in one housing and the hydraulic pump in another housing with the two housings positioned in line so that the motor and pump have their own sets of bearings and shafts that are usually engaged through internal and external splines or through flexible couplings. Such an arrangement is axially long and necessitates the use of mounting brackets and alignment guides.

As shown in U.S. Pat. No. 4,729,717, an electric motor driven inline hydraulic pump comprises a common housing, a stationary shaft mounted in said housing and piston type spaced pump cylinder block subassemblies that rotate around and are mounted on the shaft. Each subassembly includes a cylinder block and a plurality of circumferentially spaced pistons. The cylinder block subassemblies are positioned such that the pistons of one subassembly extend toward the other subassembly. A common yoke plate is mounted between the two cylinder blocks and bears the two groups of piston shoes, one on each of its two bearing surfaces. Each cylinder block is driven independently of and in a direction opposite the other by an electric motor integrally mounted such that its hollow rotor houses the block and drives it. All components described above are contained in one housing and operate submerged in hydraulic fluid.

The aforementioned electric motor driven inline hydraulic pump provides an electric motor and pump are embodied in the same housing and coupled directly without a rotating shaft; which utilizes a simple stationary shaft that is readily made and yet maintains an accurate support for the rotating pump components; which is relatively simple, axially compact and rugged in construction; which is less costly to manufacture; which reduces the audible noise; which results in equal and opposite radial and axial forces on the yoke plate thereby reducing its stresses and the force on the supporting pintle bearings to a negligible value; which results in smaller yoke spring and yoke control piston; which eliminates dynamic seals; which readily achieves a constant power operation without the aid of a compensator valve for this region; which automatically destrokes the yoke during starting should the pressure rise faster than the motor speed; which efficiently dissipates heat from the electric motor permitting the use of smaller and lighter motors capable of large overloads for short duration.

Among the objectives of the present invention are to provide a combined electric motor and pump which has the aforementioned advantages but in addition permits the pump to be entirely submerged within the hydraulic fluid interior of the housing; which is applicable to electric motors of various types such as induction electric motors, permanent magnet motors, brushless motors; and which can be adapted to various startup and speed, rotor position, pressure and fluid temperature sensing.

In accordance with the invention, the electric motor driven inline hydraulic apparatus comprising a housing having end plates closing said housing, an electric motor stator mounted in said housing, an electric motor rotor, a shaft on which the rotor is mounted is journalled in the housing and a vane type pump mounted on one of the end plates. The shaft extends through an opening in the end plate and is connected to the vane rotor of the pump. Hydraulic fluid is supplied to the interior of the electric motor housing and flows through passages in the housing to the intake of the vane pump on the end plate. In one form, the vane pump delivers fluid through an outlet in the end plate on which it is mounted. In another form, the vane pump delivers fluid through an outlet in the pump housing.

DESCRIPTION

Figure 1:
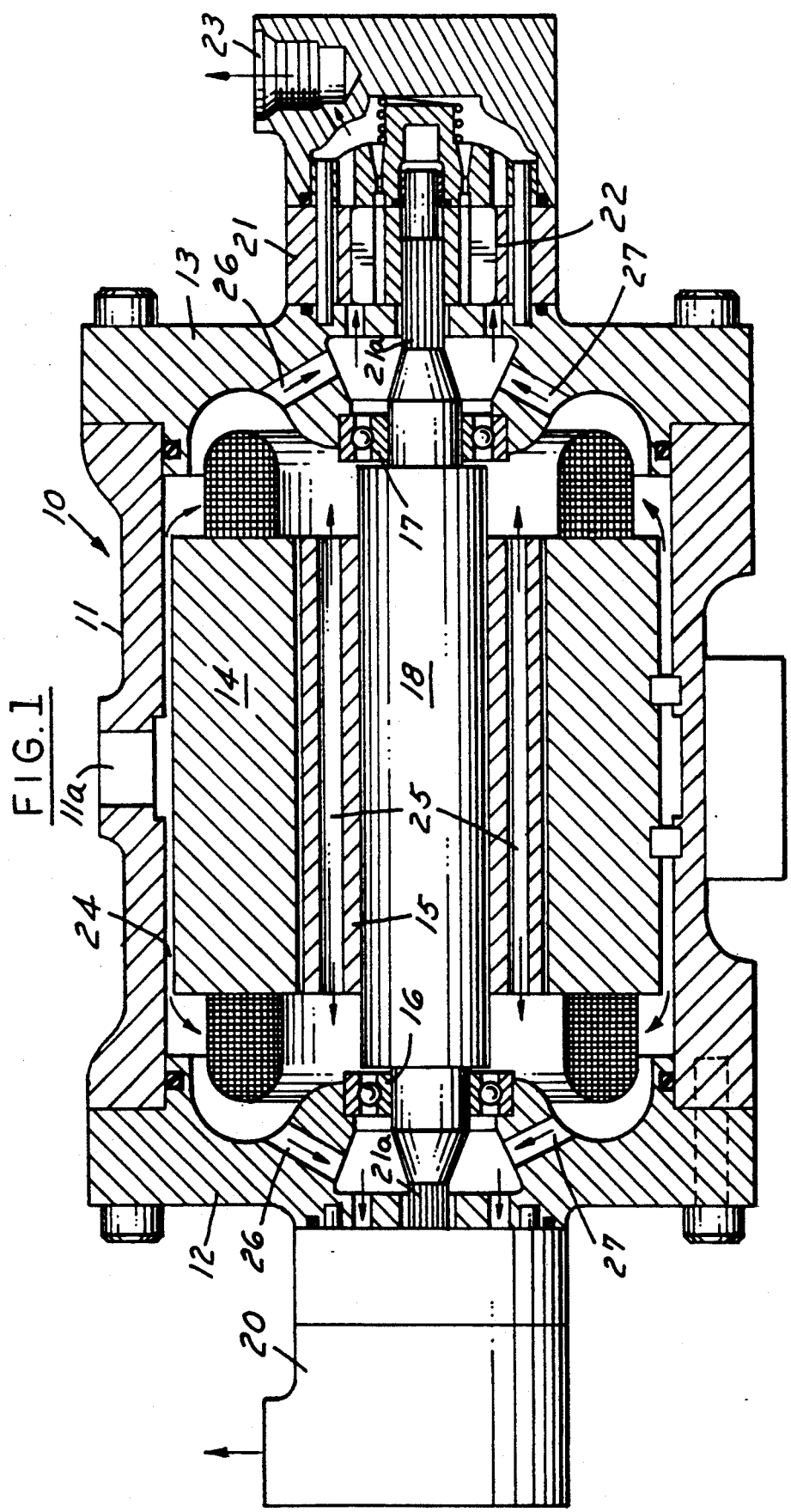
FIG. 1 is a longitudinal part sectional view of an electric motor driven inline hydraulic apparatus embodying the invention.

Referring to FIG. 1, an electric motor driven inline hydraulic apparatus 10 comprises a housing 11, end plates 12, 13 and an electric motor within the housing which includes a stator 14 and a rotor 15. The rotor 15 is rotatably mounted by bearings 16, 17 on a shaft 18, the bearings being mounted on end plates 12, 13 and housing 11. Self contained radially balnaced vane pump 20, 21 is mounted on the outer surface of each end plates 12, 13 and a portion 21a of the shaft 18 interengages the rotor 22 of the cartridge to operate the vane pump. The vane pump comprises vanes on the rotor 22 which cooperate with a cam ring, all mounted in a housing such as shown, for example, in U.S. Pat. No. 3,567,350 incorporated herein by reference. The pump includes an output passage 23.

Housing 11 includes a radial hydraulic fluid inlet 11a. When the electric motor is energized, the electric rotor 15 is rotated and the two pumps 20, 21 are caused to draw fluid from the interior of the housing 11 and a flow is established, as shown by the arrows, about the stator 14 through spaces 24 between the inner surface of the housing 10, through passages 25 in the rotor 15 to inlet passages 26, 27 in the end plates 12,13 to the respective vane pumps 20, 21.

Figure 2:
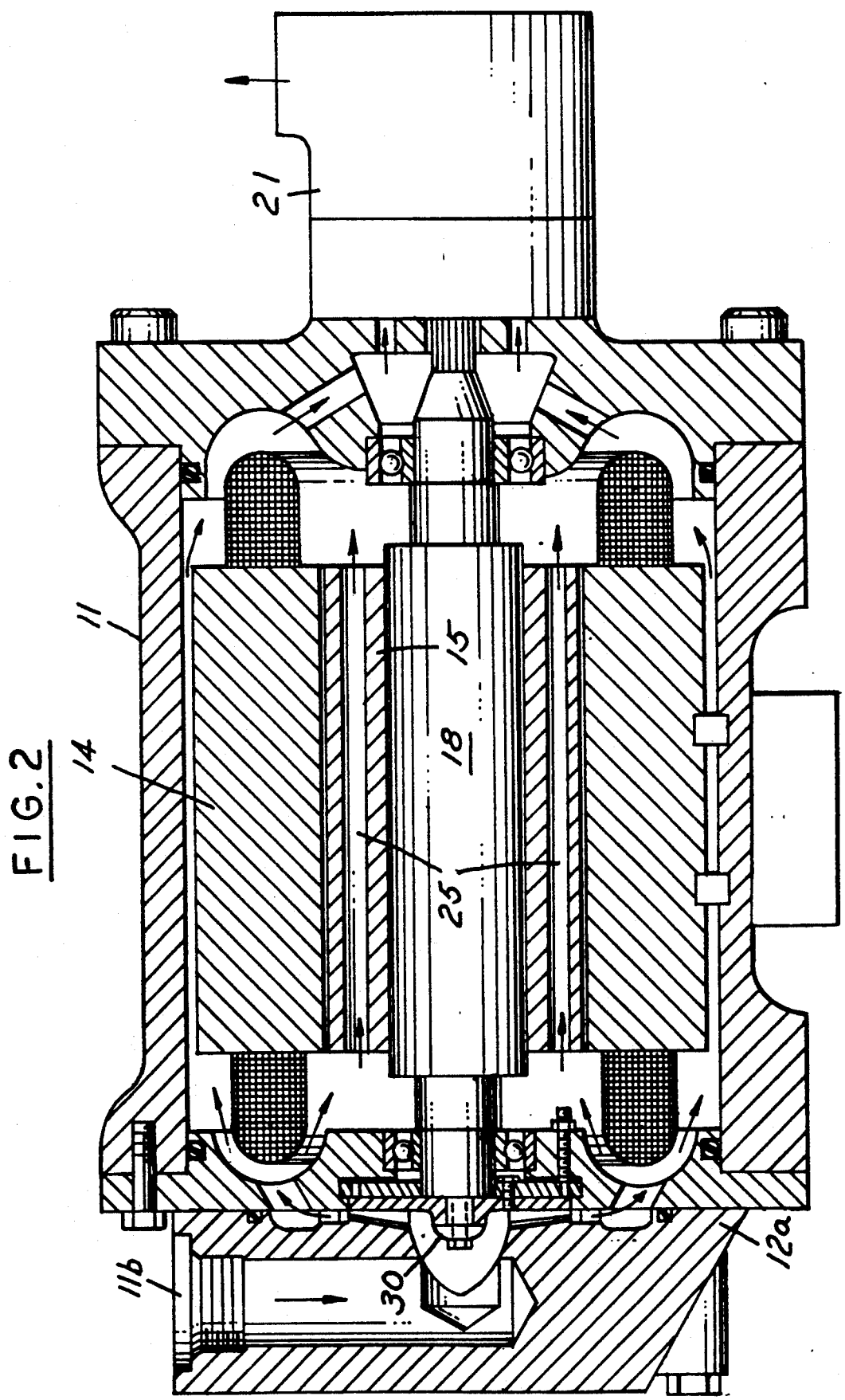
FIG. 2 is a longitudinal part sectional view of a modified form of apparatus.

In the form of the apparatus shown in FIG. 2, the basic apparatus is the same as that in FIG. 1 except only a single vane pump 21 is provided. In addition, an impeller 30 is fixed on the opposite end of shaft 18 to facilitate flow. In this form, the fluid inlet 11b is in the end plate 12a.

Figure 3:
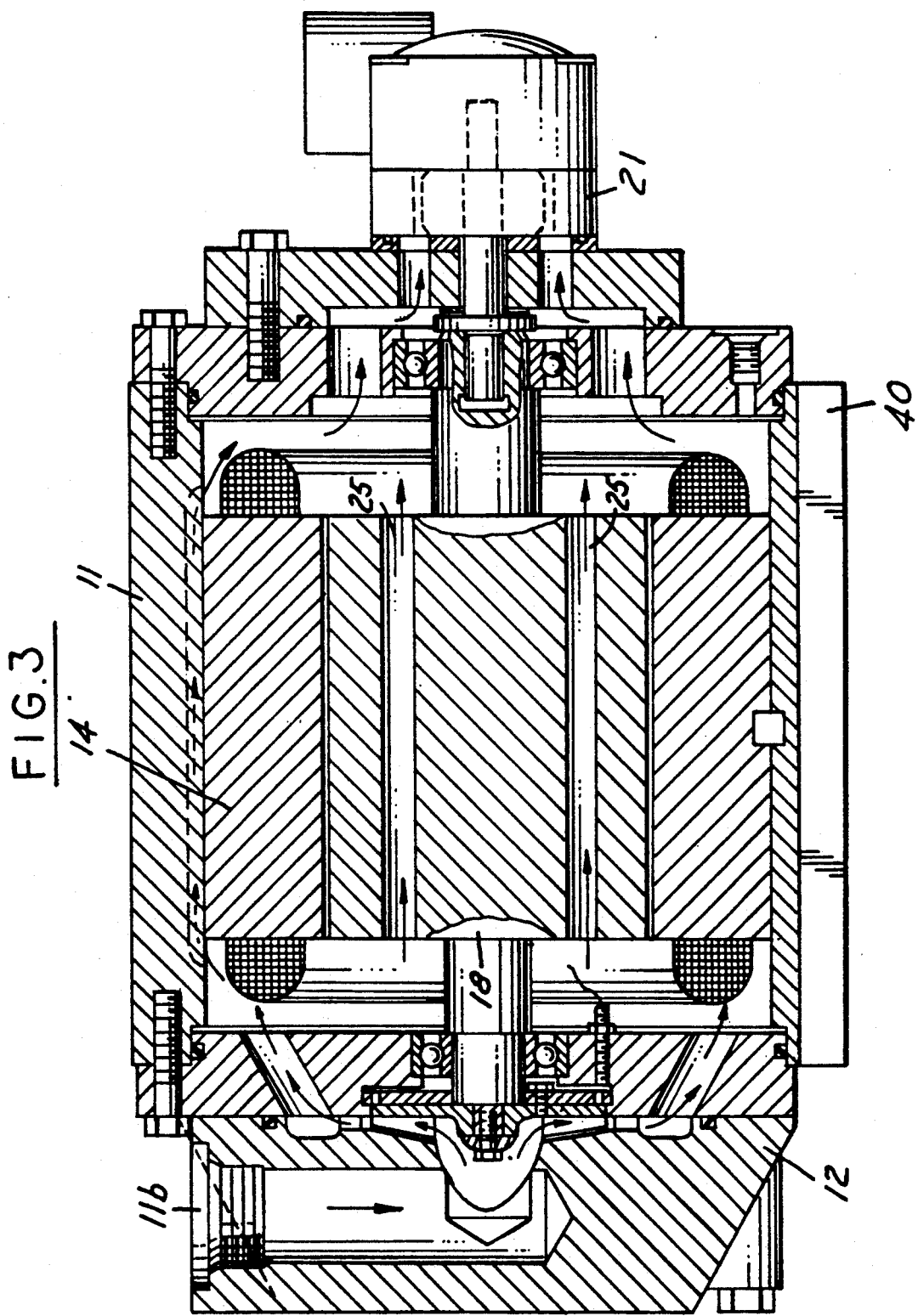
FIG. 3 is a longitudinal part sectional view of a further modified form of the invention.
Figure 4:
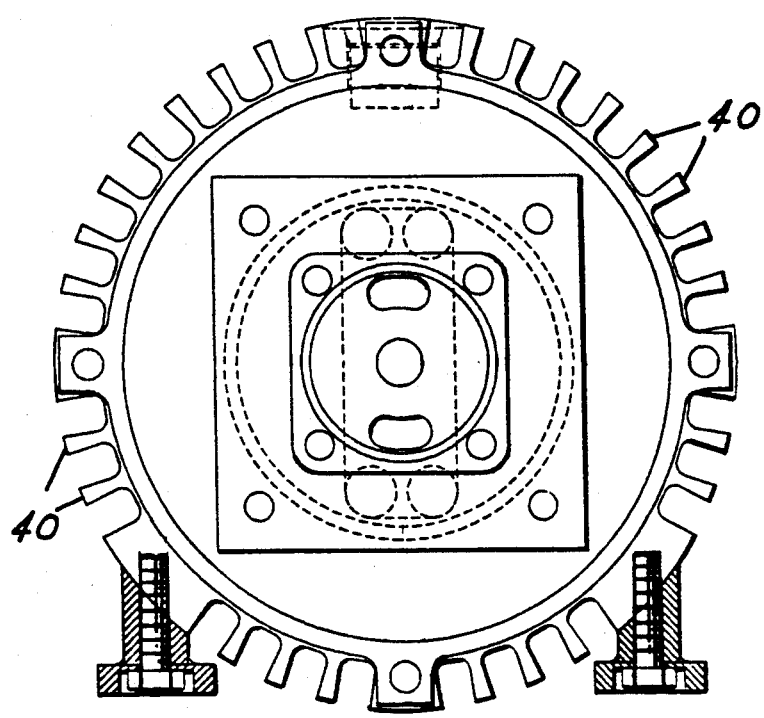
FIG. 4 is an end elevational view of the apparatus shown in FIG. 3, taken from the right.

In the form of the apparatus shown in FIGS. 3 and 4, longitudinally extending and circumferentially spaced ribs 40 are provided on housing 11 to facilitate cooling of the hydraulic fluid.

Figure 5:
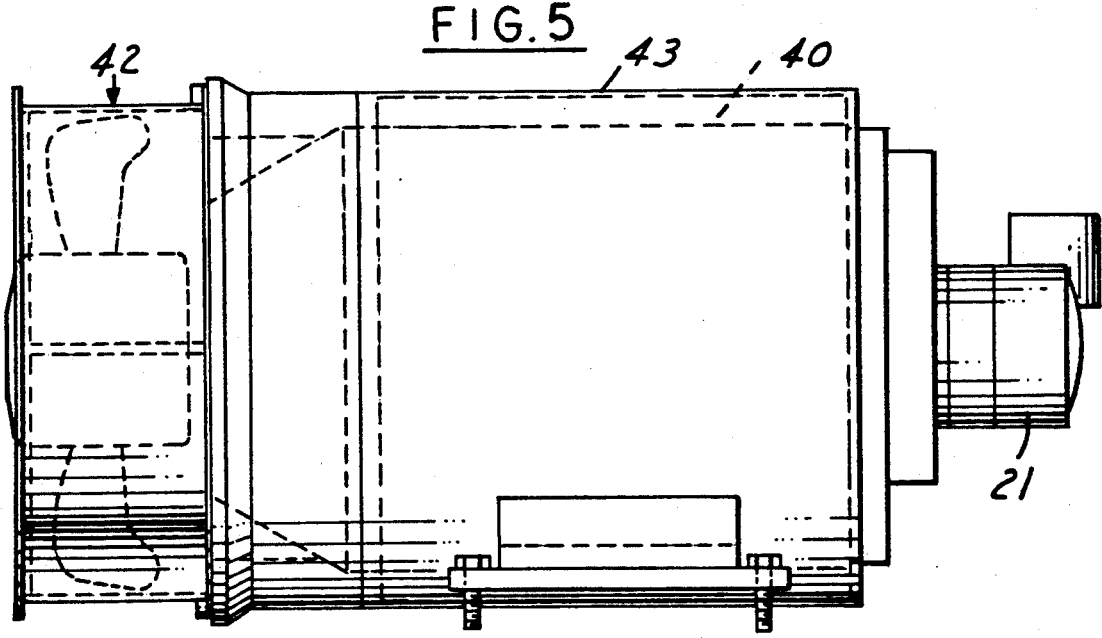
FIG. 5 is a side elevational view of another modified form of the apparatus.

The form shown in FIG. 5 is similar to that in FIGS. 3 and 4 with the addition of a blower fan 42 to circulate air between the ribs 40 to further facilitate cooling.

Figure 6:
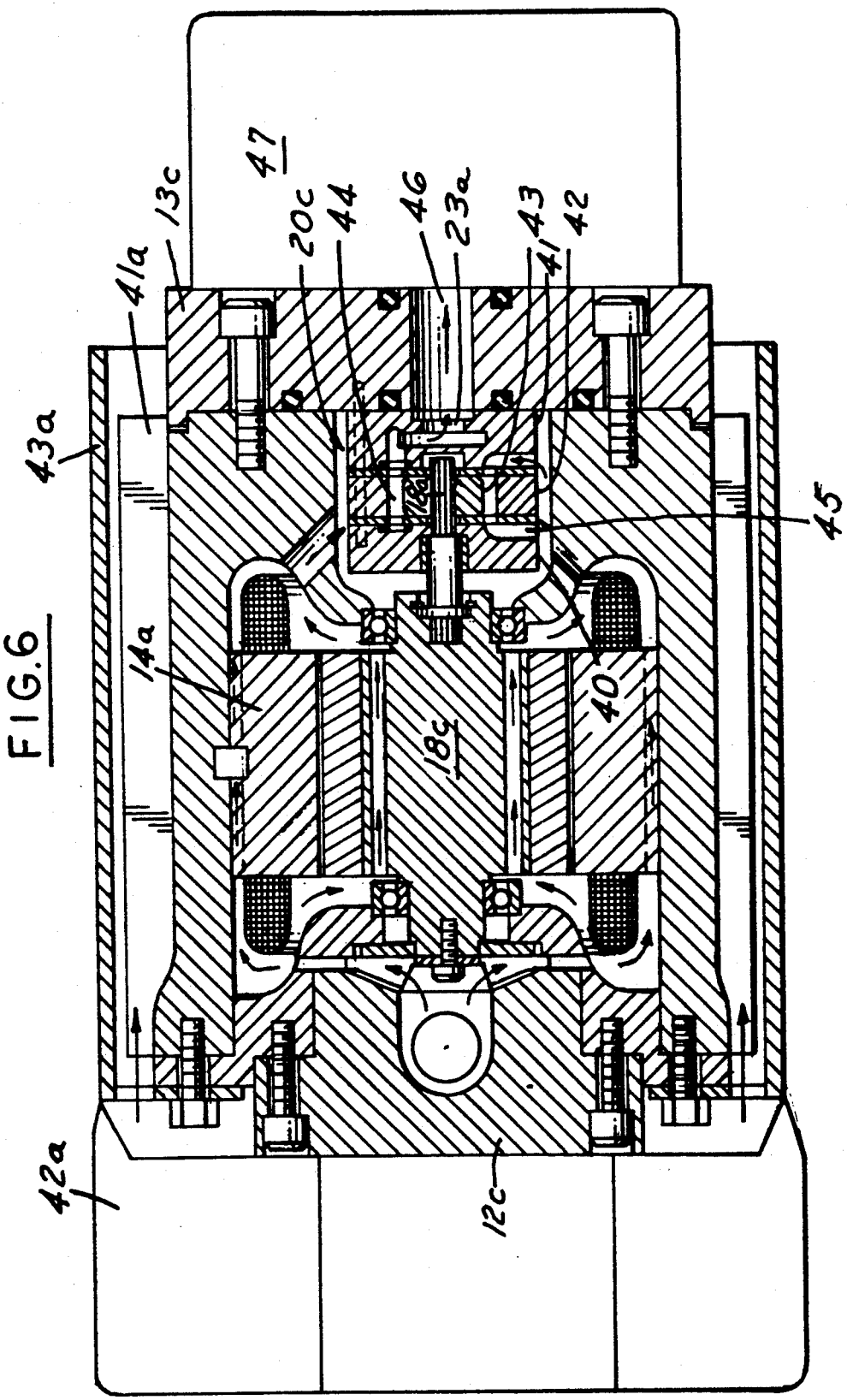
FIG. 6 is a longitudinal part sectional view of a further modified form of the apparatus.

In the form of the apparatus set forth in FIG. 6, a vane pump cartridge 20c is mounted on the interior surface of the end plate and is entirely submerged in the hydraulic fluid. Vane pump cartridge includes a rotor 43 connected to a shaft 18c to direct fluid axially through an outlet 46 in end plate 13c to a valve block 47. An open ended cylindrical housing shroud 43a about the ribs 41a directs air flow and facilitates the cooling. Vane pump 20c is preferably of the type shown and claimed in U.S. patent application Ser. No. 07/699,691 filed May 14, 1991 having a common assignee, incorporated herein by reference.

The vane pump cartridge 20c comprises end members 40, 41 supporting a cam ring 42 and a rotor 43 which has circumferentially spaced vanes 44. The end members 40, 41 have radial openings 45 through which fluid filling the housing 11 can readily flow to the inlet of the pump and thence to discharge passages and outwardly through an opening 23a to the outlet 46.

Figure 7:
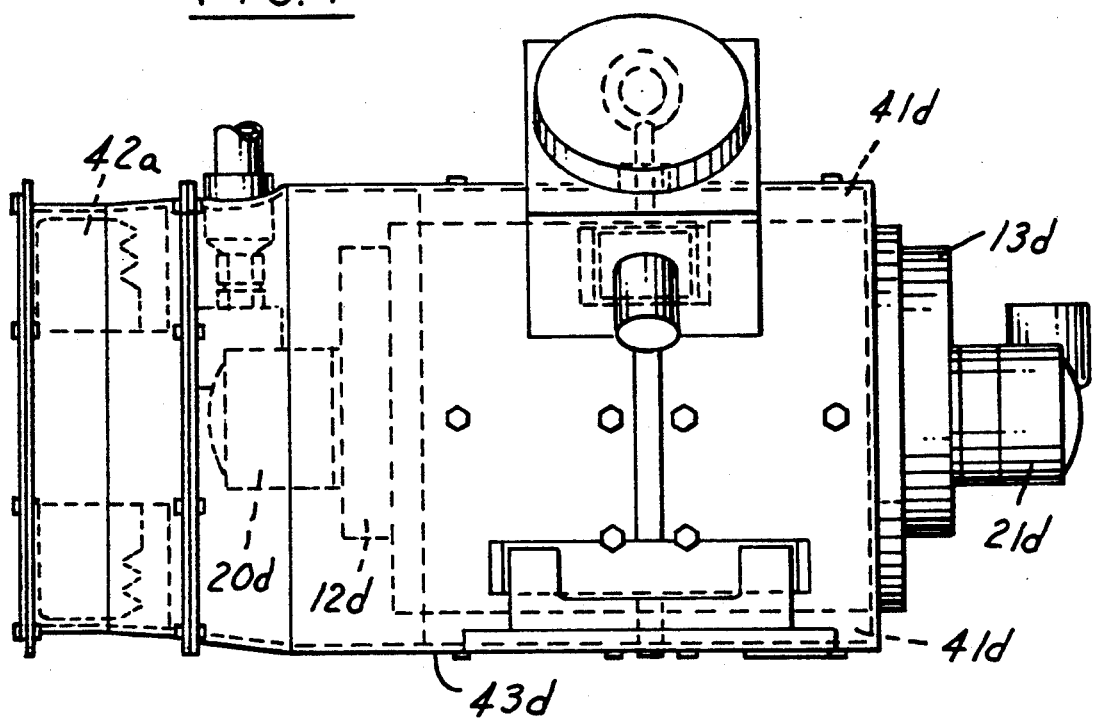
FIG. 7 is a side view of another form of the invention.

In the form shown in FIG. 7, two pumps 20d, 21d are mounted externally on the end plates 12d, 13d, in a manner similar to FIG. 1. In addition, a blower fan 42d, ribs 41d and shroud 43d are provided in a manner similar to FIG. 6.

The control system for the electric motor driven in line apparatus may be of the type shown in co-pending application Ser. No. and 07/647,609 filed Jan. 29, 1991 having a common assignee with the present application incorporated herein by reference.

Figure 8:
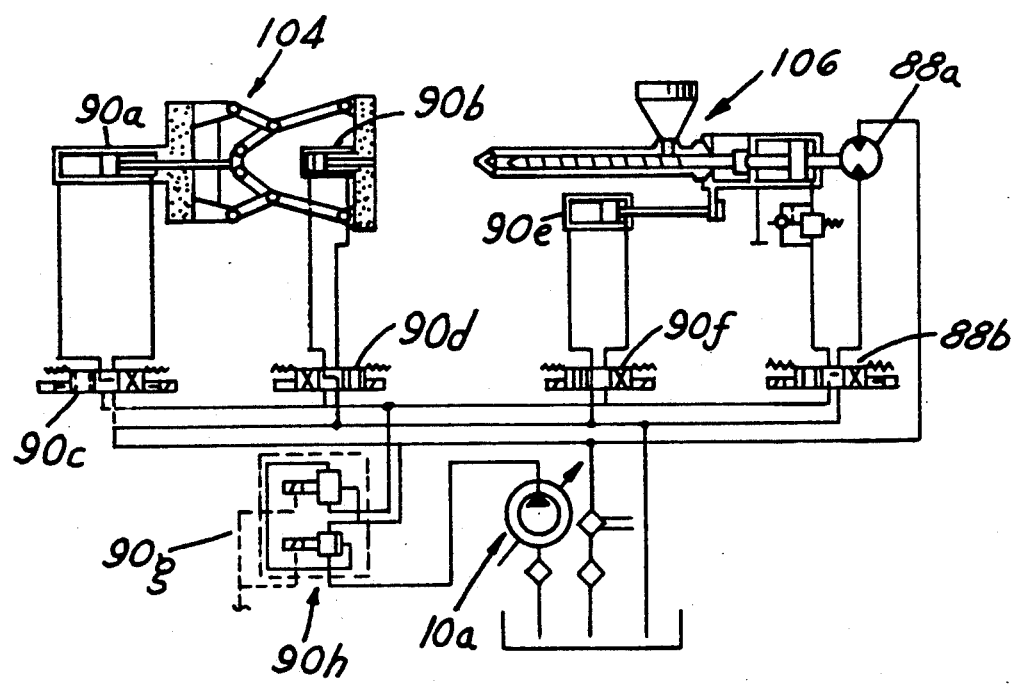
FIG. 8 is a hydraulic schematic diagram of a electric motor driven fixed displacement pump in an exemplary application for controlling operation of injection molding machinery.
Figure 9:
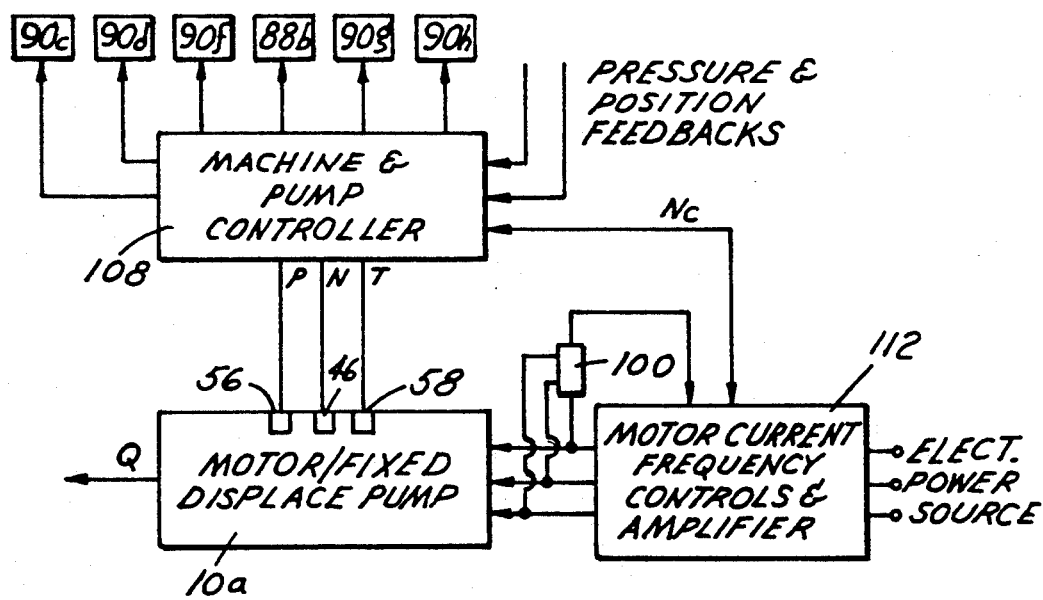
FIG. 9 is a functional block diagram of the motor/pump and electronics illustrated in FIG. 8.

Thus, FIGS. 8 and 9 illustrate implementation of the invention in a fixed displacement pump and control arrangement in an injection molding application for controlling operation of the mold clamp 104 and material injector 106 of a conventional injection molding machine. Clamp 104 includes a pair of linear actuator 90a, 90b, controlled by the respective solenoid valves 90c, 90d, for operating the two components of the clamp. Injector 106 includes a rotary actuator 88a for operating the injector screw, and a linear actuator 90e coupled to the injector ram. Actuators 88a, 90e are controlled by solenoid valves 88b, 90f. For each machine phase, the proportional valves 90g and 90h are suitably positioned by electrical signals efficiently to regulate the velocity and hydrostatic force on the machine actuators.

The regulation of the hydraulic speed and pressure related machinery functions are controlled by the pump and/or machine controller 108. The position and force at the actuators are measured and fed into the machine controller This information is compared with the input setting and corrective feedback signals are sent to the proportional valves 90g and 90h. This comparative and corrective sequence of signals is continuous to meet the preset requirements during the time the proportional valves 90g and 90h are responding to the programmed flow and pressure, the power to the electric motor/fixed displacement pump unit 10a would modulated (adjustment of the electrical current and frequency) to meet the "near" exact hydraulic power requirements without excess energy losses.

FIG. 9 illustrates a functional block diagram for control of motor/fixed displacement pump 10a. A controller 108 generator command Nc indicative of desired pump speed (discharge flow). Also, the controller instructs the solenoid operated directional valves of their operating positions and the proportional valves of their pressure and flow settings. The machine actuators perform to the instructions dictated by controller 108. The position and force (pressure) measured at the actuators are fed back and compared at the controller 108, which subsequently modulates the proportional valves 90g, 90h. To provide required flow and/or pressure. As one machine operation is completed, the controller 108 energizes the valving for the next machine sequence. The operation of the actuator is again compared to the input instruction in the controller 108, and the pressure and flow control cycle is repeated. Once the operating conditions are satisfied at the actuators by the valving, the controller 108 provides the instruction to the motor control 112 to adjust input electric power frequency to the motor/fixed displacement pump, and the pump hydraulic output is modulated to efficiency meet the system demands. This electric power frequency adjustment can be made for the respective phases of the machine cycle.

Figure 10:
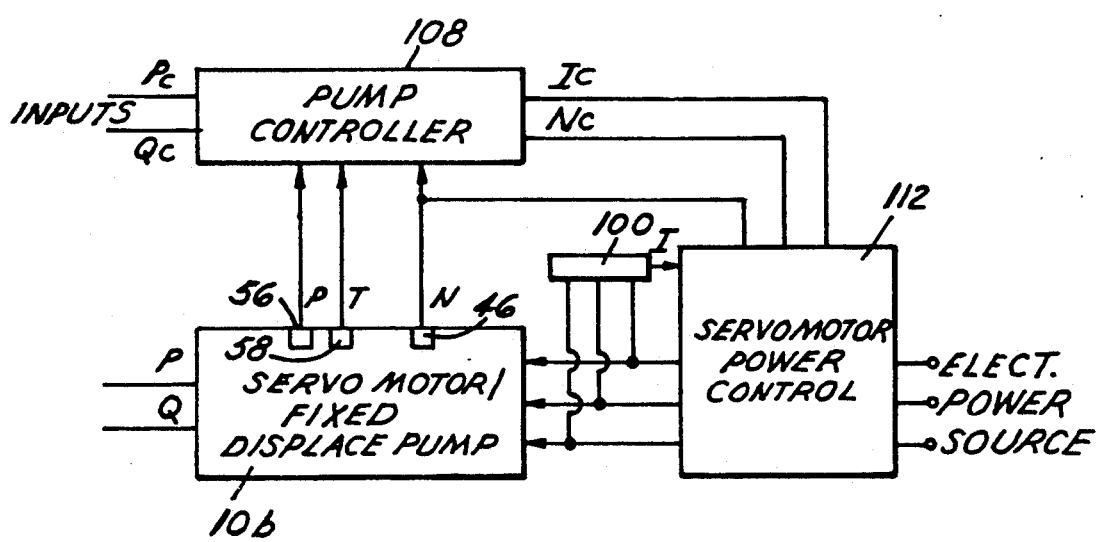
FIG. 10 is a functional block diagram of a servo motor/variable displacement pump and control electronics in accordance with another embodiment.

FIG. 10 illustrates the application of the servo electric motor technology to modulate pump flow (Q) and pressure (P). In a pressure control mode, the current to the servo motor 10b can be varied by the controller to regulate the output torque (pressure). Sensor 100 provides the current feedback of the servo motor. The pressure control can be further enhanced with a pressure sensor 56 providing a feedback signal to the pump controller (108) to adjust the current to the servo motor.

The pump output flow (Q) can be controlled by varying the speed (N) of the servo motor 10b. The flow control can be further enhanced with a motor pump fluid temperature (T) sensor 58 and the pump outlet pressure sensor 56 to provide feedback signal to the pump controller 108 to adjust (bias) the pump speed to make up for leakage.

The feedback motor/pump speed is provided by sensor 46. The servo motor possess high dynamic performance characteristics to respond and meet the pressure (P) and flow (Q) requirements.

The motor-pump can include high performance electric servo motor of the asynchronous (induction) or synchronous (permanent magnet) types to dynamically control pump shaft speed to control mode includes controlling the servo motor torque output via controller variation in current supplied to the electric servo motor.

Figures 11, 12:
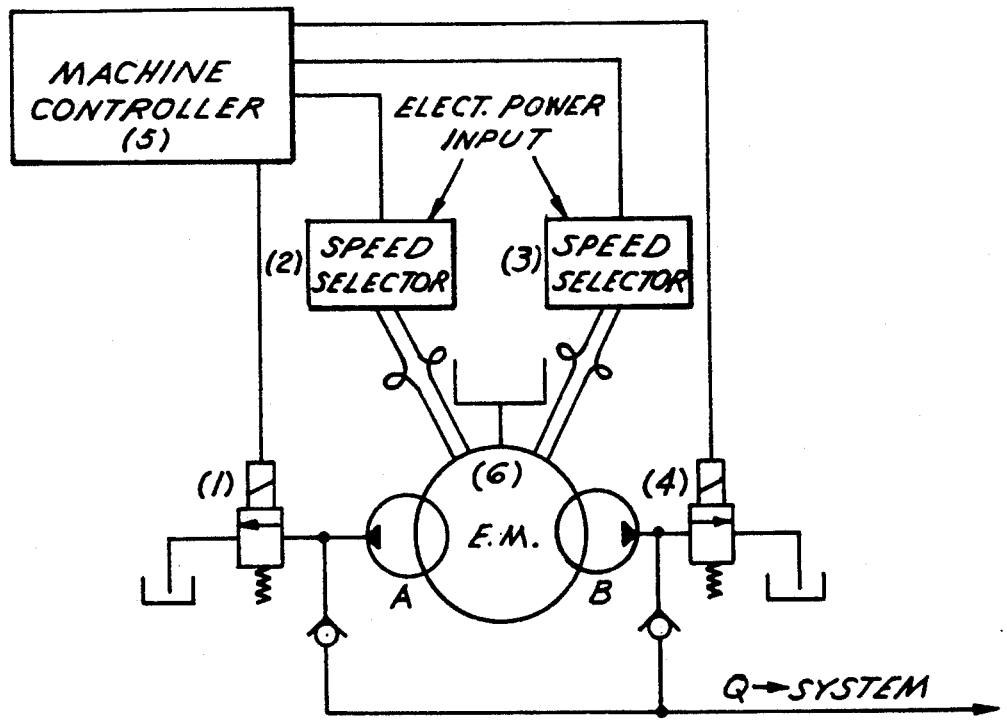
FIG. 11 is a schematic circuit of a control system for the apparatus utilizing a multi-speed electric motor.
FIG. 12 is a table of the program of the control system shown in FIG. 11.

In FIG. 11, the machine programmable controller (5), has been programmed to energize the speed selectors (2) and (3) for controlling the speed of the electric motor (6) and the electric solenoid flow unloading valves (1) and (4) in a sequence to meet the velocity demands of the actuator. The rate of flow is determined by the displacements of pump (A) and (B) and the multiple speeds of the electric motor. The electric motor (6)

and the two pump (A) and (B) feature the integrated unit assembly with a common inlet flow as heretofore described.

A typical schedule of output flow available in a double pump/2-speed electric motor installation is shown in FIG. 12.

Thus, the electronic control provides means for controlling outlet fluid pressure and flow from the pump mechanism and includes a plurality of sensors mounted on the housing for sensing operating characteristics of the pump mechanism and the motor to provide electrical sensor signals as functions thereof, and means responsive to the sensor signals for controlling application of electrical power to the motor for selectively varying speed of rotation of the motor and the pump mechanism as a function of the sensor signals.

Among the advantages of the fluid cooled integrated electric motor/vane pump assembly utilized in the present invention are:

1. Compared to a conventional electric motor, the fluid cooled motor is capable of operating with lower temperatures at the electric components. These lower temperatures permit the electric motor to operate for longer periods at overload conditions.
2. The fluid is a more efficient heat transfer agent, compared to air, and conducts the generated heat to the electric motor case where it is more readily dissipated by radiation and/or convection. In the conventional air cooled electric motor, the temperature difference between the stator windings and the motor housing is relatively large because the air is a very poor heat conduction, compared to most fluids.
3. The resulting lower temperature at the electric motor windings and the fluid emersion reduces oxidation at the windings and the life of the deposited insulation on the wires is increased
4. The integration of the electric motor/vane pump provides the following cost savings features:
  4.1 Sharing of the electric motor shaft and bearings to drive the hydraulic pump.
  4.2 Elimination of the shaft seal.
  4.3 Elimination of the shaft coupling.
  4.4 Elimination of a separate pump mounting bracket.
  4.5 Possible elimination of the electric motor fan and shroud.
  4.6 Smaller package occupies less floor space.
5. The elimination of the pump mounting brackets which reduces the noise radiating surfaces.

It can thus be seen that there has been provided a combined electric motor and pump which has the aforementioned advantages but in addition permits the pump to be entirely submerged within the hydraulic fluid interior of the housing; which is applicable to electric motors of various types such as induction electric motors, permanent magnet motors, brushless motors; and which can be adapted to various startup and speed, rotor position, pressure and fluid temperature sensing.

We claim:

1. An electric motor driven inline hydraulic apparatus comprising:
   a housing having end plates closing said housing,
   an electric motor stator mounted in said housing,
   an electric motor rotor,
   a shaft on which the rotor is mounted journalled in said housing,
   a vane type pump mounted on one of the end plates,
   said vane pump including a cam ring, a rotor and vanes on said rotor engaging said cam ring,
   said vane pump having an inlet and an outlet,
   said shaft extending through an opening in the end plate and being connected to the vane rotor of the vane pump,
   said housing having an inlet through which hydraulic fluid is supplied to the interior of the housing and flows through passages in the housing to the intake of the vane pump on the end plate, such that the vane pump delivers fluid through an outlet on the end plate on which it is mounted, and
   an programmable controller for controlling the speed of the electric motor, said pump comprising a variable speed pump, solenoid operated unloading valves operably by said controller for controlling flow from the pumps in sequence for meeting the velocity demands.

2. The apparatus set forth in claim 1 wherein said vane pump is mounted on the exterior of said end plates.

3. The apparatus set forth in claim 1 wherein said vane pump is mounted on the interior surface of said end plate and is submerged in hydraulic fluid in said housing.

4. The apparatus as set forth in claim 1, including an impeller for facilitating flow of fluid through said electric motor housing.

5. The apparatus as set forth in claim 1, including ribs on the exterior of said electric motor housing for facilitating cooling of the hydraulic fluid and the electric motor in said housing.

6. The apparatus as set forth in claim 5, including an air blower on one of said end plates for directing air over said ribs.

7. The apparatus as set forth in claim 6, including a shroud surrounding said ribs for guiding the air from said blower over said ribs.

8. The apparatus set forth in claim 7 including a second vane pump on the other end plate,
   said shaft extending through an opening in the end plate and being connected to the vane rotor of the second vane pump,
   said housing having an inlet through which hydraulic fluid is supplied to the interior of the housing and flows through passages in the housing to the intake of the second vane pump on the end plate, such that the second vane pump delivers fluid through an outlet in the end plate on which it is mounted.

9. The apparatus set forth in claim 8 wherein said vane pumps are mounted on the exterior of said housing.

10. The apparatus as set forth in claim 8 wherein said vane pumps are mounted on the interior of said housing and are entirely submerged in said housing.

11. The apparatus set forth in claim 10 including an impeller connected to said shaft for facilitating flow of fluid through said electric motor housing.

12. The apparatus as set forth in claim 8, including ribs on the exterior of said electric motor housing for facilitating cooling of the hydraulic fluid and the electric motor in said housing.

13. The apparatus as set forth in claim 12 including an air blower on one of said end plates for directing over said ribs.

14. The apparatus as set forth in claim 13 including a shroud surrounding said ribs for guiding the air from said fan over said ribs.

15. The apparatus as set forth in any one of claims 1–14 including electronic control means for controlling outlet fluid pressure and flow from said pump mechanism including a plurality of sensors mounted on said housing for sensing operating characteristics of said pump mechanism and said motor to provide electrical sensor signals as functions thereof, and means responsive to said sensor signals for controlling application of electrical power to said motor for selectively varying speed of rotation of said motor and said pump mechanism as a function of said sensor signal.

16. An electric motor driven inline hydraulic apparatus for use in supplying hydraulic fluid to a plurality of hydraulic actuators in a hydraulic system, said apparatus comprising
  a housing comprising a body having open ends and end plates closing said ends,
  an electric motor stator mounted in said housing such that circumferentially spaced portions are spaced from the interior of said body,
  an electric motor rotor,
  a shaft on which the rotor is mounted,
  anti-friction bearings on the housing rotatably supporting said shaft in said housing and supporting said rotor within said stator to provide a radial gap between the stator and rotor,
  a self-contained radially balanced vane type pump mounted on one of the end plates,
  said vane pump including a cam ring, a rotor and vanes on said rotor engaging said cam ring,
  said vane pump having a pair of inlets and an outlet,
  said shaft extending beyond one of said bearings and being connected to the vane rotor of the vane pump,
  said housing having an inlet through which hydraulic fluid from the hydraulic system is supplied to the interior of the housing,
  said housing having passages extending to a substantially annular space at an adjacent end of said stator and rotor such that hydraulic fluid flows from said annular space and through said passages in the housing to the inlets of the vane pump on the end plate, such that the vane pump delivers fluid through an outlet on the end plate on which it is mounted to the hydraulic system,
  said flow from said inlet in said housing to said annular space being substantially parallel to the axis of said apparatus in one direction only through the spaced portions between the body of the housing and the gap between that stator and rotor to said annular space in said housing to said passages in said housing.

17. The apparatus set forth in claim 16 wherein said vane pump is mounted on the exterior of said end plate, said passages in said housing also being in said end plate, said other end plate including an annular space communicating with said passages and said inlets to said pump.

18. The apparatus set forth in claim 16 wherein said pump is mounted on the exterior of said end plate, said end plate supports a bearing and includes said passages, said end plate including an annular space communicating with said passages and said inlet to said pump.

19. The apparatus set forth in claim 16 wherein said vane pump is mounted on the interior surface of said end plate and is submerged in hydraulic fluid in said housing, said passages being in said body of said housing and communicating with the spaces between the body and said pump.

20. The apparatus set forth in claim 16 wherein said vane pump is mounted on said rotor shaft for facilitating flow of fluid from said inlet to said housing, said impeller being mounted on the end of said shaft opposite to that which is connected to said rotor of said pump through said electric motor housing.

21. The apparatus set forth in claim 16 wherein said inlet to said housing is on said other end plate.

22. The apparatus set forth in claim 16 including longitudinally extending ribs on the exterior of said electric motor housing for facilitating cooling of the hydraulic fluid and the electric motor in said housing.

23. The apparatus set forth in claim 22 including an air blower on one of said end plates for directing air over said ribs.

24. The apparatus set forth in claim 23 including a shroud surrounding said ribs for guiding the air from said blower over said ribs.

25. The apparatus set forth in claim 16 including a second self-contained balanced vane pump on the other end plate,
  said shaft extending beyond the other bearing connected to the vane rotor of the second vane pump,
  said inlet to said housing comprising a radial inlet in said body of said housing such that fluid from the hydraulic system to said substantially annular space at said adjacent end of said stator and thereafter axially in both directions from the annular space toward the end plates through the spaced portions between said housing and said stator and the gap between the stator and rotor and to the passages in each of said housing.

26. The apparatus set forth in claim 25 wherein said vane pumps are mounted on the exterior of said housing.

27. The apparatus set forth in claim 25 wherein said vane pumps are mounted on said interior of said housing and are entirely submerged in said housing.

28. The apparatus set forth in claim 25 wherein said passages in said housing are in said other end plate, said end plate including an annular space communicating with said second pump.

29. The apparatus set forth in claim 25 including longitudinally extending ribs on the exterior of said electric motor housing for facilitating cooling the hydraulic fluid and the electric motor in said housing.

30. The apparatus set forth in claim 29 including an air blower on one of said end plates for directing air over said ribs.

31. The apparatus set forth in claim 30 including a shroud surrounding said ribs for guiding the air from said fan over said ribs.

32. The apparatus set forth in any one of claims 16–31 including electronic control means for controlling outlet fluid pressure and flow from said pump mechanism including a plurality of sensor mounted on said housing for sensing operating characteristics of said pump mechanism and said motor to provide electrical sensor signals as functions thereof, and means responsive to said sensor signals for controlling application of electric power to said motor for selectively varying speed of rotation of said motor and said pump mechanism and regulating outlet pressure as a function of said sensor signals.

33. The apparatus set forth in any one of claims 16–31, including a programmable controller for controlling the speed of the electric motor, said pump comprising a variable speed pump, solenoid operated unloading valves operably by said controller for controlling flow from the pumps in sequence for meeting the velocity demands.

* * * * *